United States Patent Office 3,042,669
Patented July 3, 1962

3,042,669
CELLULOSIC DERIVATIVES OF TRIAZINYL-
BENZOTRIAZOLES
Richard J. Boyle, Neshanic, and Jerry P. Milionis, South
Bound Brook, N.J., assignors to American Cyanamid
Company, New York, N.Y., a corporation of Maine
No Drawing. Original application June 11, 1959, Ser.
No. 819,536. Divided and this application June 28,
1960, Ser. No. 39,222
8 Claims. (Cl. 260—214)

This invention relates to cellulose esterified with new triazine derivatives of hydroxyaryl-benzotriazole. More specifically also, it relates to cellulose having at least 0.01% of the total free hydroxyl groups in the molecule esterified by compounds of the formula

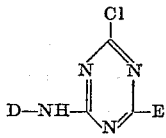

in which D is a 2-(o-hydroxyaryl)benzotriazole in which the aryl group is a carbocyclic radical of less than three six-membered rings and E may be chlorine, the group —NHD in which D is defined above, sulfoalkylamino or carboxyalkylamino. Such cellulose has a minimum of 0.1% of its weight as UV absorber.

It has been demonstrated that ultraviolet light has a tendency to cause the deterioration of cellulose whether in the form of sheets of regenerated cellulose or in the form of natural or renegerated fibers. This has been shown by protecting the fibers with ultraviolet light absorbing screens and measuring the decrease in deterioration upon exposure of ultraviolet light. Means have therefore been sought to protect the fibers by the utilization of ultraviolet absorbing compounds. One way suggested is to incorporate ultraviolet absorbing compounds in resin latices and use these latices in the resin treatment of the fibers. Since the absorbing power of films decreases as they become thinner this has proved to be a very inefficient method because a film of the thickness which can be tolerated on the fiber screens out only a very small amount of ultraviolet radiation.

We have found a much more satisfactory solution to this problem in that we have devised a way of making a benzotriazole ultraviolet light absorber an integral part of the cellulose molecule. We achieve this object by esterifying the hydroxyls of the cellulose molecule, a minimum of 0.01% of the hydroxyls being esterified, with a class chlorotriazinylamino-2-hydroxy-arylbenzotriazoles. This class of triazinylamino-2-hydroxyarylbenzotriazoles as defined below, is claimed in our copending application, Serial No. 819,536, filed June 11, 1959, of which this application is a division.

AMINOBENZOTRIAZOLE DERIVATIVES

The aminobenzotriazole intermediates used in our invention are amino-2-hydroxyarylbenzotriazoles in which the aryl group is a carbocyclic radical of less than three six-membered rings. The amino group can be on the 2-aryl radical or it can be on the benzo ring. Either ring may be further substituted by chloro, bromo, sulfonamido, alkoxy or alkyl.

These compounds are prepared by one of two ways, depending on where the amino group is to be. When the amino group is to be on the benzotriazole portion of the molecule, an o-aminophenol is diazotized and coupled into a meta phenylenediamine. The coupling takes place ortho to one of the amino groups and the resulting o-aminoazo body is then triazoled by oxidation in the usual manner. This synthesis can be illustrated by the following preparation of the simplest member of the series:

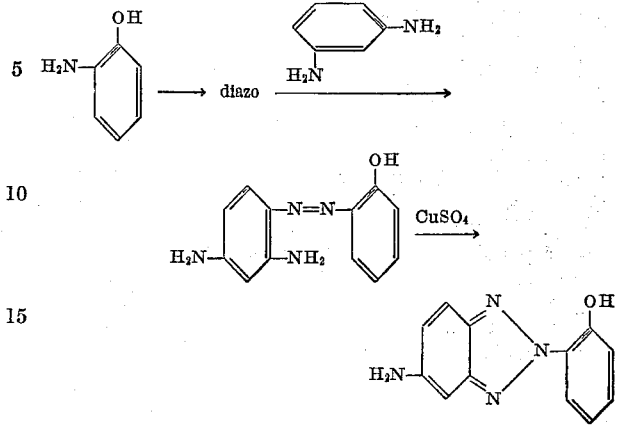

The o-aminophenols which can be used in this synthesis include o-aminophenol and any of its chloro, bromo, sulfonamide, alkoxy or alkyl derivatives such as 2-amino-4-chlorophenol
2-amino-4-bromophenol
2-amino-3,5-dibromophenol
2-amino-4,6-dichlorophenol
2-amino-4,6-dibromophenol
2-amino-4-nitrophenol
2-amino-5-nitrophenol
2-amino-6-nitrophenol
2-amino-6-chloro-4-nitrophenol
2-amino-4-chloro-5-nitrophenol
2-amino-6-bromo-4-nitrophenol
2-amino-4-bromo-6-nitrophenol
2-amino-4,6-dinitrophenol
2-amino-6-methylphenol
2-amino-4-methylphenol
2-amino-6-methyl-5-bromophenol
2-amino-4-nitro-6-methylphenol
2-amino-5,6-dimethylphenol
2-amino-4,6-dimethylphenol
2-amino-4,6-dimethylphenol
2-amino-5-methoxyphenol
2-amono-5-ethoxyphenol
2-amino-5-methylresorcinol
6-amino-4-methylresorcinol
6-amino-2-methylresorcinol
2-amino-3-hydroxybenzoic acid
3-amino-4-hydroxybenzoic acid
4-amino-3-hydroxybenzoic acid
3-amino-4-hydroxybenzene sulfonic acid
3-amino-4-hydroxy-6-chlorobenzene sulfonic acid
3-amino-4-hydroxy-5-methylbenzene sulfonic acid
4-amino-5-hydroxy-2-methylbenzene sulfonic acid
3-amino-2-hydroxy-5-methylbenzene sulfonic acid
3-amino-2-hydroxy-5-chlorobenzene sulfonic acid
3-amino-2-hydroxy-5-nitrobenzene sulfonic acid
4-amino-3-hydroxybenzene sulfonic acid
3-amino-4-hydroxybenzene sulfonamide
4-aminoresorcinol The phenylene diamines usable in this synthesis include both m-phenylenediamine and its derivatives. A position ortho to one amino must be unsubstituted and must bear such relation to the other substituents that coupling will take place there. Phenylenediamines which are usable include Metaphenylenediamine
1,3-diamino-2-chlorobenzene
1,3-diamino-4-chlorobenzene
1,3-diamino-5-chlorobenzene 1,3-diamino-2,5-dichlorobenzene
1,3-diamino-4-bromobenzene
1,3-diamino-5-bromobenzene
2,4-diaminotoluene
2,6-diaminotoluene
2,4-diaminometaxylene
3,5-diaminoanisole
2,4-diaminoanisole
2,4-diaminophenatole When the amino group is to be in the 2-aryl radical, a different synthesis is used. An o-nitroaniline is diazotized and coupled with an aminophenol under conditions in which coupling takes place ortho to the phenol group. This ordinarily means, in the benzene series, a m- or p-amino phenol. In the naphthalene series, one must use an aminonaphthol in which the amino group is preferably in the other ring. The ortho nitro group is then reduced. Triazolization occurs by the reduction. An example of such a synthesis is the following:

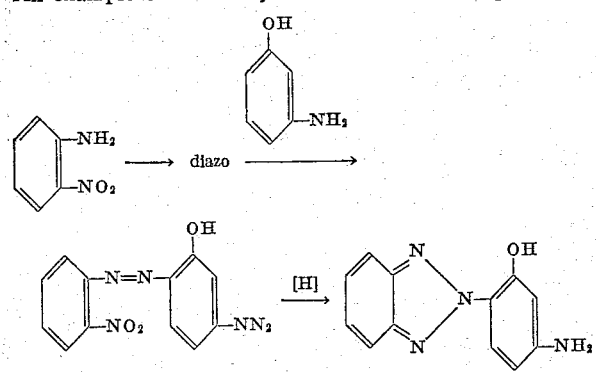

The nitroanilines which may be used include

Ortho-nitroaniline
6-methoxy-2-nitroaniline
6-ethoxy-2-nitroaniline
5-hydroxy-2-nitroaniline
5-methoxy-2-nitroaniline
4-hydroxy-2-nitroaniline
4-methoxy-2-nitroaniline
4-ethoxy-2-nitroaniline
3-nitroanthranilic acid
2-nitro-3-aminobenzoic acid
3-nitro-4-aminobenzoic acid
4-nitro-3-aminobenzoic acid
3-nitrosulfanilic acid
3-nitrosulfanilamide
2-nitro-4-chloroaniline
2-nitro-5-chloroaniline
2-nitro-3,6-dichloroaniline
2-nitro-4,5-dichloroaniline
2-nitro-4,6-dichloroaniline
2-nitro-5,6-dichloroaniline
2-nitro-3,4,6-trichloroaniline
2-nitro-4-bromoaniline
2-nitro-5-bromoaniline
2-nitro-6-bromoaniline
2-nitro-4-bromo-5-chloroaniline
2-nitro-4-bromo-6-chloroaniline
2-nitro-4-chloro-6-bromoaniline
2-nitro-4-iodoaniline
2-nitro-5-iodoaniline
2-nitro-4,6-diiodoaniline
2,4-dinitroaniline
2-nitro-meta-toluidine
4-nitro-meta-toluidine
3-nitro-para-toluidine The aminophenols usable in this synthesis include 3-aminophenol
2-methyl-3-aminophenol
4-methyl-3-aminophenol
2-chloro-3-aminophenol
4-ethoxy-3-aminophenol
5-aminoresorcinol
4-aminophenol
2-methyl-4-aminophenol
3-methyl-4-aminophenol
3,5-dichloro-4-aminophenol
2-chloro-4-aminophenol
2-bromo-4-aminophenol
3,5-dimethyl-4-aminophenol
3-methoxy-4-aminophenol
4-ethoxy-4-aminophenol A third synthesis of such aminobenzenetriazoles uses 2,4-dinitroaniline as a starting material. This is diazotized and coupled to a para substituted phenol having an ortho position open. The nitro groups are then reduced which forms the triazole ring and the amino group on the benzo ring. This method is thus usable for this type of compound only. The phenols which can be used as coupling components include phenols and the naphthols and their alkyl, alkoxy, chloro, or bromo derivatives such as 4-chlorophenol
Para-cresol
4-tert-butyl-ortho-cresol
2-tert-butyl-para-cresol
Para-tert-butylphenol
4-chloro-meta-cresol
2-chloro-para-cresol
5-chloro-2-hydroxybenzenesulfonic acid
4-chlororesorcinol
5-chlorosalicylaldehyde
Para-methoxyphenol
Para-ethoxyphenol
Para-butoxyphenol
Para-benzyloxyphenol
Para-lauroxyphenol
2,4-dimethylphenol
Beta-naphthol
1-naphthol sulfonic acid
2-naphthol-6-sulfonamide These aminobenzotriazoles form one embodiment of our invention. They are useful, as will be described, in the preparation of the triazinylaminobenzotriazoles of our invention and also of the esterified cellulose of our invention. They, however, have other uses as intermediates for the linking of ultraviolet absorbers of the benzophenone type directly into polymers. This can be done by the utilization of the free amino group which can be reacted with reactive groups in polymers, such as methylol groups or other such reactive groups.

A further embodiment of our invention, claimed in our parent application, are chlorotriazinyl aminohydroxybenzophenones of the formula

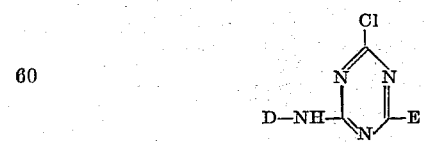

in which D represents a 2-(o-hydroxyaryl)benzotriazole in which the aryl group is a carbocyclic radical of less than three six-membered rings and E represents either chlorine, the group —NHD, sulfoalkylamino or carboxyalkylamino. Such compounds are formed by the reaction of cyanuric chloride with the aminohydroxybenzotriazoles described above. For example, cyanuric chloride and 5-amino-2-(o-hydroxyphenylbenzotriazole) react in acetone at room temperature to form a mixture of 2,4-dichloro-6-[2-(o-hydroxyphenyl)benzotriazolyl-5-amino]-s-triazine and 2-chloro-4,6-bis[2-hydroxyphenylbenzotriazolyl-5-amino]-s-triazine. These two compounds are easily separable by fractional crystallization. If the reaction is carried out at lower temperatures the product is almost exclusively the 2,4-dichloro derivative. At higher temperatures and with an excess of the amino hydroxybenzotriazole a good yield of the bis-anilino triazine is obtained. The other aminobenzotriazoles discussed and all the variations and derivatives under that topic above can similarly be used. In each case either one or two chlorines of the cyanuric chloride can be replaced by an aminohydroxybenzotriazole.

The dichlorotriazinylaminobenzotriazole compounds of our invention may be further modified by reaction with one mol of an aminoalkane sulfonic acid or an aminoalkyl carboxylic acid. Thus, for example, 2,4-dichloro-6-[2 - (o - hydroxy-phenyl)benzotriazolyl - 5 - amino]-s-triazine can be reacted with taurine with an aqueous acetone alkaline medium under reflux to form 2-chloro-4(2-sulfoethylamino) - 6 - [2(o - hydroxyphenyl)-benzotriazolyl-5-amino]-s-triazine. Similarly, the other amino acids can be used in place of the taurine, such as glycine, alanine, serine, 3-aminopropionic acid, 3-aminopropanesulfonic acid, 4-amino butanesulfonic acid and the like. The chlorotriazinylaminobenzotriazoles of our invention which also have, as a second substituent on the triazine ring, an aminoalkyl acid of this nature, are more easily applied to fibers and give better results. Consequently, these are the preferred species.

The chlorotriazinyl hydroxybenzotriazole compounds of our invention can be applied to cellulosic materials to yield a product protected against the deteriorating effect of ultraviolet light. They can be applied like any dyestuff, especially those modifications having a carboxyalkylamino or sulfoalkylamino substituent on the triazine ring. The cellulosic materials may be dyed later or they may be dyed before being dyed with the chloro triazine hydroxybenzotriazoles of this invention. In some cases the dyestuff and the benzotriazole compound may be applied simultaneously. In each case a material is obtained which has a high capacity for absorbing ultraviolet light and which retains its capacity through repeated washing.

MODIFIED CELLULOSE

A further embodiment of our invention is cellulose modified by having at least 0.01% of its free hydroxyl groups esterified with a chlorotriazinylamino benzotriazole of the above definition. While the chlorotriazinylaminobenzotriazoles described above can be used in many cases like ordinary dyes, when they are applied to the fiber in an alkaline medium it has been found that they are capable of reaction with the hydroxyls of the cellulose to form esters. These modified cellulose polymers form this embodiment of our invention. They are cellulose having as an integral part of its molecule a built-in ultraviolet light stabilizer. Such cellulose not only is more stable than ordinary cellulose but also the ultraviolet light stabilizer built into the cellulose molecule gives added protection to dyestuffs placed upon the fiber rendering them more light fast also.

The modified cellulose of our invention is obtained by treating cellulose with chlorotriazinylamino benzotriazoles of the types described above in alkaline medium at elevated temperatures. The benzotriazole derivative can be put on the cellulose in advance of the heating with alkali or simultaneously with this treatment. A minimum of 90° C. is needed to effect the chemical combination. The alkali used may be a strong alkali (NaOH, KOH, LiOH, Ca(OH)$_2$) or a weaker acid binder (soda ash, potash and the like). Sufficient is used to neutralize all the hydrogen chloride which theoretically could be evolved from the benzotriazole compound used and still keep the mixture alkaline.

At least 0.01% of the total hydroxyls in the cellulose molecule should be esterified to achieve effective protection against ultraviolet light.

The cellulose may be in the form of fibers or in the form of sheets. It may be natural cellulose or regenerated cellulose, it may be in the form of cotton, linen, hemp, jute, rayon, cellophane or the like.

Our invention can be illustrated by the following examples in which parts are by weight unless otherwise specified.

*Example 1*

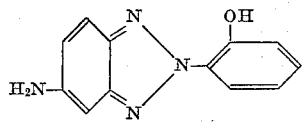

A solution of 0.25 mole of ortho-aminophenol in 250 cc. of water containing 1.04 moles of hydrochloric acid is diazotized with 0.26 mole of sodium nitrite. The solution of diazonium salt is then added to a solution of 0.25 mole of meta-phenylenediamine in 500 parts of water containing 0.25 mole of hydrochloric acids. Concentrated sodium acetate is then added dropwise at 5° C. until the solution does not change Congo red paper. The mixture is then stirred and allowed to warm to room temperature. The product is isolated by filtration and washed successively with 10% sodium bicarbonate solution and water.

The product is added to a solution of 1.25 parts of copper sulfate in a mixture of 750 parts of water, 750 parts of methanol and 1250 parts of ammonium hydroxide solution. The mixture is stirred and refluxed until triazolization is substantially complete. The product is isolated by filtration and then suspended in glacial acetic acid. The mixture is brought to a boil and zinc dust is added to destroy unreacted azo compounds. The zinc is removed by filtration and the filtrate is drowned in water. The brown solid which separates is collected. It may be recrystallized from alcohol.

*Example 2*

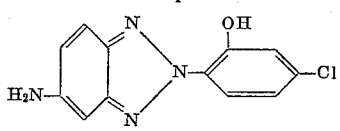

The procedure of Example 1 is followed using 4-chloro-2-aminophenol in place of the ortho-aminophenol. Similarly, the correspondingly substituted amino-hydroxyphenylbenzotriazole is obtained when 3,5-dibromo-2-aminophenol, 6 - methyl - 2 - aminophenol, 6 - methyl-4-bromo-2-aminophenol, 4,5-dimethyl - 2 - aminophenol, 5-methoxy - 2 - aminophenol, 5 - ethoxy-2-aminophenol, 5-methyl-2-aminophenol or 2-amino-5-methyl resorcinol is used.

*Example 3*

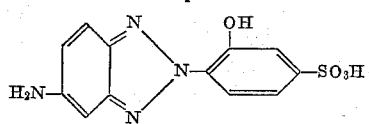

The procedure of Example 1 is followed using 3-amino-4-hydroxybenzene sulfonic acid in place of the ortho-aminophenol, except that the final product is salted out of the drowned filtrate. Similarly, correspondingly substituted compounds are obtained when 3-amino-4-hydroxy-5-chlorobenzenesulfonic acid or 3-amino-4-hydroxy-5-methylbenzenesulfonic acid are used.

*Example 4*

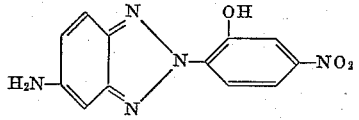

The procedure of Example 1 is followed using in place of ortho-aminophenol an equivalent quantity of 4-nitro ortho-aminophenol. The treatment with zinc glacial acetic acid is omitted and purification is effected solely by recrystallization. When the treatment with zinc and glacial acetic acid is used instead, the corresponding nitro group is reduced and the corresponding diamine is obtained.

Similarly, other correspondingly substituted nitroaminophenylbenzotriazoles and diaminophenylbenzotriazoles are obtained when 6-chloro-4-nitro-2-aminophenol, 4-chloro-5-nitro-2-aminophenol and 4-nitro-6-methyl-2-aminophenol are used.

*Example 5*

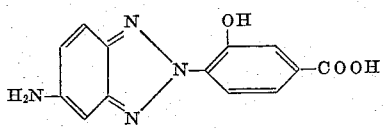

The procedure of Example 1 is followed using 4-amino-3-hydroxybenzoic acid in equivalent quantities in place of the orthoaminophenol.

*Example 6*

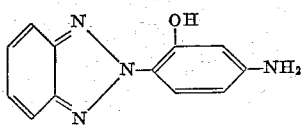

A solution of 55.2 parts of ortho-nitroaniline in 320 cc. of hydrochloric acid solution diluted with an equivalent quantity of water is diazotized with 27.6 parts of sodium nitrite. The excess nitrite is removed with six parts of sulfamic acid. The clear diazonium chloride solution is then added dropwise to a cooled solution of 65.5 parts of meta-aminophenol in 2,000 parts of water containing 120 parts of concentrated hydrochloric acid. The crude product is collected as the hydrochloric acid salt of the amine azo body.

The dye is slurried in water and basified with sodium hydroxide to obtain the free amino dyestuffs. 480 parts of five normal sodium hydroxide is then added to the slurry followed by 78.5 parts of zinc dust. The mixture is added gradually in order to effect the triazolization. The crude product is isolated by filtration and can be recrystallized from alcohol.

*Example 7*

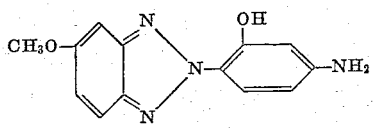

The procedure of Example 6 is followed using in place of ortho-nitroaniline an equivalent quantity of 5-methoxy-ortho-nitroaniline. Similarly, other correspondingly substituted amino benzotriazole derivatives are obtained when 6 - methoxy-ortho-nitroaniline-4-ethoxy-ortho-nitroaniline, 5 - hydroxy-ortho-nitroaniline, 4 - chloro-ortho-nitroaniline, 4-chloro-6-bromo-ortho-nitroaniline or 3,4,6-trichloro-ortho-nitroaniline are used.

*Example 8*

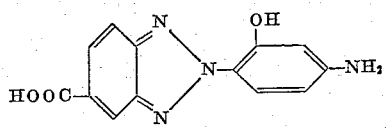

The procedure of Example 6 is followed using an equivalent quantity of 3-nitro-4-aminobenzoic acid in place of the ortho-nitroaniline. The product is isolated by acidification after the triazolization procedure.

Similarly other correspondingly substituted aminohydroxyphenylbenzotriazoles are obtained when 3-nitrosulfonic acid and 3-nitroanthranilic acid are used.

*Example 9*

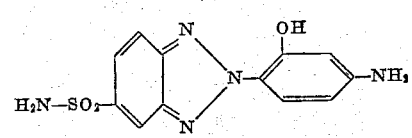

The procedure of Example 6 is followed using an equivalent quantity of 3-nitrosulfanilamide in place of ortho-nitroaniline. Similarly, other correspondingly substituted hydroxyaminophenylbenzotriazoles are obtained when 4 - iodo - ortho - nitroaniline - 5 - methyl - ortho - nitroaniline are used in place of ortho-nitroaniline.

*Example 10*

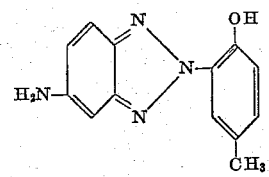

17.5 parts of sodium nitrite is added to 675 parts of concentrated sulfuric acid at room temperature. After the mixture is cooled to room temperature, 42 parts of 2,4-dinitroaniline is added slowly while the temperature of the mixture is maintained at 30 to 35° C. After diazotization is complete, this mixture is poured onto ice. The resulting solution is added to a cooled slurry of 27 parts of p-cresol, 563 parts of sodium hydroxide and 1000 parts of water while cooling in an ice bath. The mixture is allowed to stir while warming slowly to room temperature. The mixture is neutralized with HCl and the azo dye is filtered.

The dye is added to 1000 parts of 5 N NaOH. 100 parts of powdered zinc is added and this mixture is stirred and heated at 90° C. until the reaction is substantially complete. The mixture is filtered and the filtrate is neutralized with HCl. The tan solid is filtered and treated with hot glacial acetic acid and powdered zinc. The zinc is filtered off and the filtrate is flooded with water. The solid which forms is filtered off.

*Example 11*

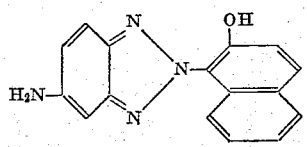

The procedure of Example 10 is followed using an equivalent quantity of beta-naphthol in place of the para-cresol. Similarly, other correspondingly substituted compounds are obtained when 6-chloro-betanaphthol or 5-methyl-beta-naphthol are used in place of the para-cresol.

*Example 12*

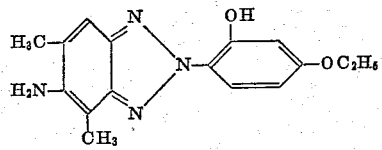

The procedure of Example 1 is followed using an equivalent quantity of 2,4-dimethylmetaphenylene diamine in place of the meta-phenylenediamine and an equivalent quantity of 5-ethoxy-ortho-aminophenol in place of ortho-aminophenol.

Example 13

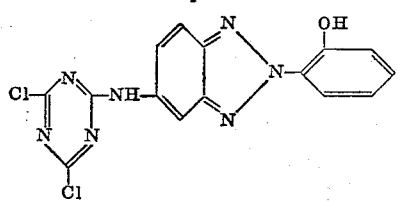

To a solution of 8.8 parts of the product of Example 1 in a mixture of 100 parts of acetone and 100 parts of water containing 3.3 parts of sodium bicarbonate. There is added while stirring the solution at 0–5° C. 7.2 parts of cyanuric chloride. The mixture is stirred at 0–5° C. until the reaction is complete. The yellow solid which precipitates is isolated by filtration. It can be recrystallized from acetone to give fractions one of which comprises the above formula and the other of which comprises the bis-triazolyl triazine in which one of the above chlorines is replaced by another amino triazole moiety.

Example 14

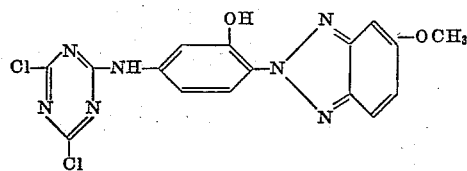

The procedure of Example 13 is followed using an equivalent quantity of the product of Example 7 in place of the product of Example 1.

Example 15

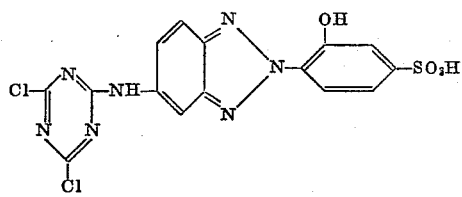

The procedure of Example 13 is followed using an equivalent quantity of the product of Example 3 instead of the product of Example 1. Similarly, the correspondingly substituted compound is obtained with the product of Example 5 is used in place of the product of Example 1.

Example 16

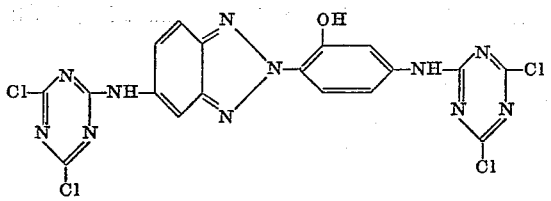

The procedure of Example 13 is followed using in place of the product of Example 1 one half of an equivalent quantity of the product of Example 4 obtained using the zinc acetic acid reductive treatment.

Example 17

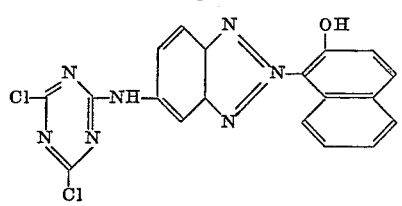

The procedure of Example 13 is followed using in place of the product of Example 1 an equivalent quantity of the product of Example 11. Similarly, when any of the other amino substituted 2-hydroxyarylbenzotriazoles described in the preceding examples are used in place of the product of Example 1 the correspondingly substituted dichlorotriazinylamino substituted benzotriazole is obtained.

Example 18

A sample of cellophane film (0.1734 gram) is placed 50 ml. of a solution of 0.0259 gram of 2,4-dichloro-6-[2-(o - hydroxyphenyl) benzotriazolyl-5-amino]-s-triazine in acetone. After one half hour, 100 ml. of a developing solution (10 parts of soda ash and 60 parts of sodium chloride to 1000 parts of water) are poured into the acetonecellophane bath. After one hour, the sample of cellophane is removed from the bath, rinsed, dried and tested spectrophotometrically. The sample shows an absorption peak at 333 mµ with an absorbance of 0.312. The curve of a 0.0026% solution of 2,4-dichloro-6-[2-(o-hydroxyphenyl)benzotriazolyl-5-amino]-s-triazine in acetone also showed an absorption peak at 333 mµ with an absorbancy of 0.996. This indicates that a wash-fast reaction product has been formed between the cellophane and the 2,4-dichloro-6-[2-(o-hydroxyphenyl)benzotriazolyl-5-amino]-s-triazine when they are combined in an acetone-alkaline aqueous bath. Knowing that the cellophane is 0.023 centimeter thick and has a density of 1.45, the percent by weight of the triazine derivative on the cellophane is calculated to be about 0.02%.

Example 19

0.40 gram of the product of Example 13 is fused with 0.80 gram of Renex 25, a commercial dispersing agent, and diluted with 40 ml. of water. This solution is padded on cotton several times, drying between padding, and dried at room temperature. The amount of absorber on the cotton is determined spectrophotometrically and is found to be 1.36% O.W.F.

A fixing solution is prepared by dissolving 25 ml. of 30° Bé. sodium hydroxide and 150 g. of sodium chloride in 500 ml. of water. The cotton sample is placed in the fixing solution and heated at 160° F. for 15 minutes. The sample is soaped and rinsed. The amount of absorber fixed to the cotton is calculated from a nitrogen analysis of the sample as 0.46% on the weight of the fiber.

Similarly, if the other chlorotriazinyl benzotriazole described above are used, the cloth is similarly dyed. Such dyed cloth has increased resistance to ultra-violet light deterioration.

Example 20

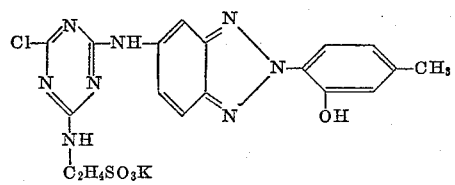

5 - (4,6 - dichloro - s - triazine) - 2 - (2 - hydroxy - 4 - methylphenyl) benzotriazole (24 parts), taurine (12.5 parts) and potassium carbonate (13.8 parts) are refluxed in a mixture of acetone (1000 parts) and water (250 parts) until the reaction is substantially complete. The mixture is filtered and the filtrate allowed to stand. The product separates out, is filtered and oven dried. When the taurine in the above reaction mixture is replaced with an equivalent amount of glycerine, alanine, serine, or 3-aminopropionic acid, the corresponding carboxyalkyl-aminotriazinyl compound is obtained.

Example 21

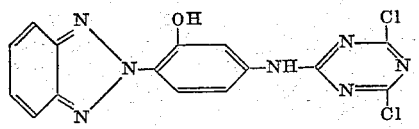

2-(4-amino-2-hydroxyphenyl)benzotriazole (7.9 g.) in 350 cc. of acetone is added to a finely divided suspension of cyanuric chloride (6.5 g.) in 50 cc. of acetone and 200 cc. of water at 0–5° C., and the resulting mixture is stirred at this temperature until the reaction mixture is substantially complete. The solid which forms is collected and recrystallized twice from acetone and water.

We claim:
1. Cellulose having at least 0.01% of the total free hydroxyl groups esterified by compounds of the formula

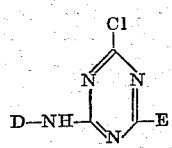

in which D is a 2-(ortho-hydroxyaryl)benzotriazole, in which the aryl group is a carbocyclic radical of less than three six-membered rings and in which E is selected from the group consisting of chlorine, the group NHD, sulfoalkylamino and carboxyalkylamino wherein D is as hereinbefore defined.

2. The cellulose of claim 1 in which the esterifying compound is

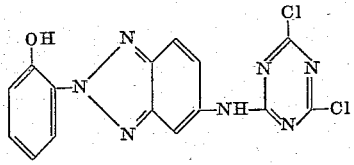

3. The cellulose of claim 1 in which the esterifying compound is

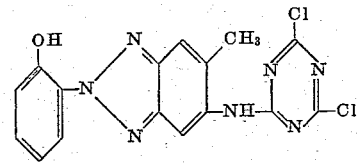

4. The cellulose of claim 1 in which the esterifying compound is

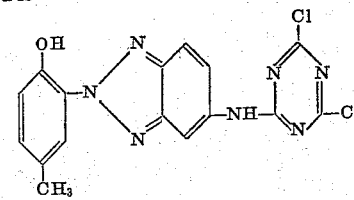

5. The cellulose of claim 1 in which the esterifying compound is

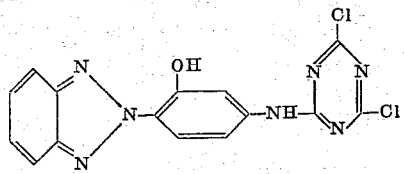

5. The cellulose of claim 1 in which the esterifying compound is

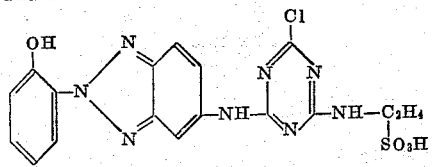

7. The cellulose of claim 1 in which the esterifying compound is

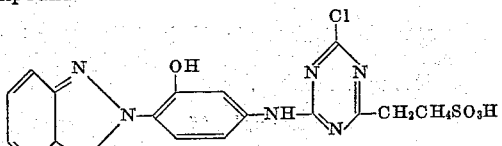

8. The cellulose of claim 1 in which the esterifying compound is

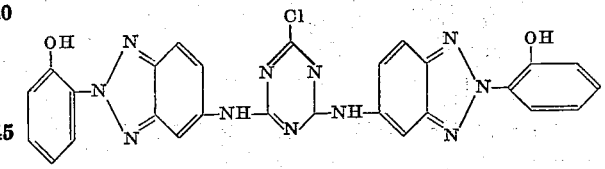

References Cited in the file of this patent
UNITED STATES PATENTS

| | | |
|---|---|---|
| 1,886,480 | Haller et al. | Nov. 8, 1932 |
| 2,332,047 | Bock et al. | Oct. 19, 1943 |
| 2,375,838 | Coolidge et al. | May 15, 1945 |

UNITED STATES PATENT OFFICE

CERTIFICATE OF CORRECTION

Patent No. 3,042,669                                               July 3, 1962

Richard J. Boyle et al.

It is hereby certified that error appears in the above numbered patent requiring correction and that the said Letters Patent should read as corrected below.

Column 2, line 45, for "amono" read -- amino --; column 3, line 33, for that portion of the formula "$-NN_2$" read -- $-NH_2$ --; column 10, line 28, for "Knowning" read -- Knowing --; column 12, line 20, for the claim number "5" read -- 6 --.

Signed and sealed this 21st day of May 1963.

(SEAL)
Attest:

ERNEST W. SWIDER                                       DAVID L. LADD
Attesting Officer                                        Commissioner of Patents